US009495934B2

(12) United States Patent
Baek et al.

(10) Patent No.: US 9,495,934 B2
(45) Date of Patent: Nov. 15, 2016

(54) LIQUID CRYSTAL DISPLAY DEVICE AND METHOD FOR DRIVING THE SAME

(75) Inventors: Young Sang Baek, Goyang-si (KR); Yeon Ho Choi, Paju-si (KR); Sun Woo Kwag, Paju-si (KR); Man Gyu Park, Seoul (KR); Yong Duk Lee, Paju-si (KR); Sang Kwan Kim, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 1227 days.

(21) Appl. No.: 12/153,270

(22) Filed: May 15, 2008

(65) Prior Publication Data

US 2008/0284773 A1 Nov. 20, 2008

(30) Foreign Application Priority Data

May 16, 2007 (KR) ........................ P10-2007-047767

(51) Int. Cl.
*G06F 3/038* (2013.01)
*G09G 5/00* (2006.01)
*G09G 3/36* (2006.01)

(52) U.S. Cl.
CPC .......... *G09G 3/3696* (2013.01); *G09G 3/3688* (2013.01); *G09G 2320/0276* (2013.01); *G09G 2330/021* (2013.01); *G09G 2330/045* (2013.01)

(58) Field of Classification Search
USPC ......... 345/204, 87, 211, 92, 210, 95, 98, 89, 345/215
See application file for complete search history.

(56) References Cited

U.S. PATENT DOCUMENTS

| | | | | |
|---|---|---|---|---|
| 6,429,841 | B1 * | 8/2002 | Lee | 345/89 |
| 8,044,903 | B2 * | 10/2011 | Sun | 345/89 |
| 2003/0090451 | A1 * | 5/2003 | Ahn | G09G 3/3688 345/96 |
| 2006/0114205 | A1 * | 6/2006 | Shen et al. | 345/88 |
| 2006/0132415 | A1 * | 6/2006 | Yu | 345/98 |
| 2007/0046600 | A1 | 3/2007 | Sun | |
| 2008/0136761 | A1 * | 6/2008 | Hong et al. | 345/89 |
| 2008/0170027 | A1 * | 7/2008 | Kyeong et al. | 345/100 |
| 2008/0303809 | A1 * | 12/2008 | Lee | 345/215 |

FOREIGN PATENT DOCUMENTS

TW 200606809 2/2006

* cited by examiner

*Primary Examiner* — Nicholas Lee
(74) *Attorney, Agent, or Firm* — Dentons US LLP

(57) ABSTRACT

A liquid crystal display device and a method for driving the same are disclosed. The device includes a gamma voltage generation circuit for generating first to ith positive gamma reference voltages having different levels, and first to ith negative gamma reference voltages having different levels, and a plurality of data drive chips, each of the data drive chips converting digital data input thereto into a positive data voltage and a negative data voltage and supplying the positive data voltage and negative data voltage to a liquid crystal display panel, and adjusting a level of the positive data voltage based on a positive gamma reference voltage supplied thereto, among the first to ith positive gamma reference voltages, and adjusting a level of the negative data voltage based on a negative gamma reference voltage supplied thereto, among the first to ith negative gamma reference voltages.

6 Claims, 5 Drawing Sheets

LIQUID CRYSTAL DISPLAY DEVICE AND METHOD FOR DRIVING THE SAME

This application claims the benefit of Korean Patent Application No. 10-2007-0047767, filed on May 16 2007, which is hereby incorporated by reference for all purposes as if fully set forth herein.

BACKGROUND OF THE INVENTION

Field of the Invention

The present invention relates to a liquid crystal display device, and more particularly, to a gamma reference voltage supply pattern for driving a liquid crystal display device, and a method for driving the same.

Discussion of the Related Art

A liquid crystal display device displays an image by adjusting light transmittance of liquid crystal cells depending on a video signal. A liquid crystal display device of an active matrix type in which a switching element is formed for every liquid crystal cell is well suited for the display of a moving images using active control of the switching element. A thin film transistor (referred to hereinafter as a "TFT") is commonly used as the switching element of an active matrix type liquid crystal display as shown in FIG. 1.

Referring to FIG. 1, the liquid crystal display device of the active matrix type converts digital input data into an analog data voltage based on a gamma reference voltage and supplies the analog data voltage to a data line DL, and, at the same time, supplies a scan pulse to a gate line GL, so as to charge a liquid crystal cell Clc.

The TFT has a gate electrode connected to the gate line GL, a source electrode connected to the data line DL, and a drain electrode connected to a pixel electrode of the liquid crystal cell Clc and one electrode of a storage capacitor Cst.

A common voltage Vcom is supplied to a common electrode of the liquid crystal cell Clc.

When the TFT is turned on, the storage capacitor Cst is charged with a data voltage applied from the data line DL. The storage capacitor Cst acts to maintain a voltage in the liquid crystal cell Clc constant.

At the time that the scan pulse is applied to the gate line GL, the TFT is turned on to form a channel between the source electrode and the drain electrode to supply the voltage on the data line DL to the pixel electrode of the liquid crystal cell Clc. The arrangement of liquid crystal molecules of the liquid crystal cell Clc is changed due to an electric field between the pixel electrode and the common electrode, thereby modulating incident light.

A liquid crystal display device according to the related art with pixels each having this equivalent circuit includes a data driving circuit for converting input digital data into an analog data voltage and supplying the analog data voltage to a liquid crystal display panel. This data driving circuit is made up of a plurality of data drive chips as shown in FIG. 2.

Referring to FIG. 2, the data driving circuit 100 included in the related art liquid crystal display device, includes a plurality of data drive chips 110-1 to 110-i each for adjusting the level of a positive data voltage based on a positive gamma reference voltage PGMA input thereto and for adjusting the level of a negative data voltage based on a negative gamma reference voltage NGMA input thereto. Here, i is a natural number greater than or equal to 2.

The data drive chip 110-1 converts input digital data into an analog data voltage and supplies the analog data voltage to the liquid crystal display panel. The data drive chip 110-1 adjusts the level of a positive data voltage based on a positive gamma reference voltage PGMA 1 input thereto and adjusts the level of a negative data voltage based on a negative gamma reference voltage NGMA1 input thereto. Here, the positive gamma reference voltage PGMA1 and the negative gamma reference voltage NGMA1 have the same levels, and current of a level proportional to the levels of the positive gamma reference voltage PGMA1 and negative gamma reference voltage NGMA1 is supplied to the data drive chip 110-1.

The data drive chip 110-2 converts input digital data into an analog data voltage and supplies the analog data voltage to the liquid crystal display panel. The data drive chip 110-2 adjusts the level of a positive data voltage based on a positive gamma reference voltage PGMA2 input thereto and adjusts the level of a negative data voltage based on a negative gamma reference voltage NGMA2 input thereto. Here, the positive gamma reference voltage PGMA2 and the negative gamma reference voltage NGMA2 have the same levels, and current of a level proportional to the levels of the positive gamma reference voltage PGMA2 and negative gamma reference voltage NGMA2 is supplied to the data drive chip 110-2.

The data drive chip 110-(i-1) converts input digital data into an analog data voltage and supplies the analog data voltage to the liquid crystal display panel. The data drive chip 110-(i-1) adjusts the level of a positive data voltage based on a positive gamma reference voltage PGMA(i-1) input thereto and adjusts the level of a negative data voltage based on a negative gamma reference voltage NGMA(i-1) input thereto. Here, the positive gamma reference voltage PGMA(i-1) and the negative gamma reference voltage NGMA(i-1) have the same levels, and current of a level proportional to the levels of the positive gamma reference voltage PGMA(i-1) and negative gamma reference voltage NGMA(i-1) is supplied to the data drive chip 110-(i-1).

The data drive chip 110-i converts input digital data into an analog data voltage and supplies the analog data voltage to the liquid crystal display panel. The data drive chip 110-i adjusts the level of a positive data voltage based on a positive gamma reference voltage PGMAi input thereto and adjusts the level of a negative data voltage based on a negative gamma reference voltage NGMAi input thereto. Here, the positive gamma reference voltage PGMAi and the negative gamma reference voltage NGMAi have the same levels, and current of a level proportional to the levels of the positive gamma reference voltage PGMAi and negative gamma reference voltage NGMAi is supplied to the data drive chip 110-i.

Further, the data drive chips 110-3 to 110-(i-2) have the same functions as those of the above-stated data drive chips 110-1, 110-2, 110-(i-1) and 110-i.

Notably, the positive gamma reference voltages PGMA1 to PGMAi have different levels and the negative gamma reference voltages NGMA1 to NGMAi also have different levels. As a result, currents of different levels are supplied to the data drive chips 110-1 to 110-i.

For example, assuming that the positive gamma reference voltage PGMA1 and negative gamma reference voltage NGMA1 are lowest in level and the positive gamma reference voltage PGMAi and negative gamma reference voltage NGMAi are highest in level, current of a very high level is supplied to the data drive chip 110-i, whereas current of a relatively low level is supplied to the data drive chip 110-1. As a result, excessive heat is generated in the data drive chip 110-i due to the supplied current of the high level.

As mentioned above, the related art liquid crystal display device has a disadvantage in that excessive heat is generated in data drive chips supplied with currents of high levels, among a plurality of data drive chips. Moreover, because a positive gamma reference voltage and a negative gamma reference voltage having the same levels are supplied to each data drive chip, the addition of current supplied together with the positive gamma reference voltage and current supplied together with the negative gamma reference voltage may excessively raise the temperature of data drive chips due to the heat being generated in specific data drive chips.

SUMMARY OF THE INVENTION

Accordingly, the present invention is directed to a liquid crystal display device and a method for driving the same that substantially obviates one or more problems due to limitations and disadvantages of the related art.

An advantage of the present invention is to provide a liquid crystal display device that can reduce the amounts of currents to be applied to specific ones of a plurality of data drive chips by changing setting of a gamma reference voltage supply pattern, and a method for driving the same.

Another advantage of the present invention is to provide a liquid crystal display device that can change setting of a gamma reference voltage supply pattern to reduce the amounts of currents to be applied to specific ones of a plurality of data drive chips, so as to significantly lower the temperatures due to heat generated in the specific data drive chips, and a method for driving the same.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, a liquid crystal display device comprises: a gamma voltage generation circuit for generating first to ith positive gamma reference voltages, where i is a natural number that is greater than or equal to two having different levels, and first to ith negative gamma reference voltages having different levels; and a plurality of data drive chips, each of the data drive chips converting digital data input thereto into a positive data voltage and a negative data voltage and supplying the positive data voltage and negative data voltage to a liquid crystal display panel, and adjusting a level of the positive data voltage based on a positive gamma reference voltage supplied thereto, among the first to ith positive gamma reference voltages, and adjusting a level of the negative data voltage based on a negative gamma reference voltage supplied thereto, among the first to ith negative gamma reference voltages, wherein the positive gamma reference voltage and negative gamma reference voltage supplied to each of the data drive chips have different levels.

In another aspect of the present invention, a method for driving a liquid crystal display device comprises: generating first to ith positive gamma reference voltages, where i is a natural number that is greater than or equal to two having different levels, and first to ith negative gamma reference voltages having different levels; and a plurality of data drive chips each converting digital data input thereto into a positive data voltage and a negative data voltage and supplying the positive data voltage and negative data voltage to a liquid crystal display panel, and adjusting a level of the positive data voltage based on a positive gamma reference voltage supplied thereto, among the first to ith positive gamma reference voltages, and adjusting a level of the negative data voltage based on a negative gamma reference voltage supplied thereto, among the first to ith negative gamma reference voltages, wherein the positive gamma reference voltage and negative gamma reference voltage supplied to each of the data drive chips have different levels.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to an embodiment of the present invention, an example of which is illustrated in the accompanying drawings. Wherever possible, the same reference numbers will be used throughout the drawings to refer to the same or like parts. In the following description of the present invention, detailed description of known functions and configurations incorporated herein will be omitted where the details will obscure the discussion of the subject matter of the invention.

Figure 3:
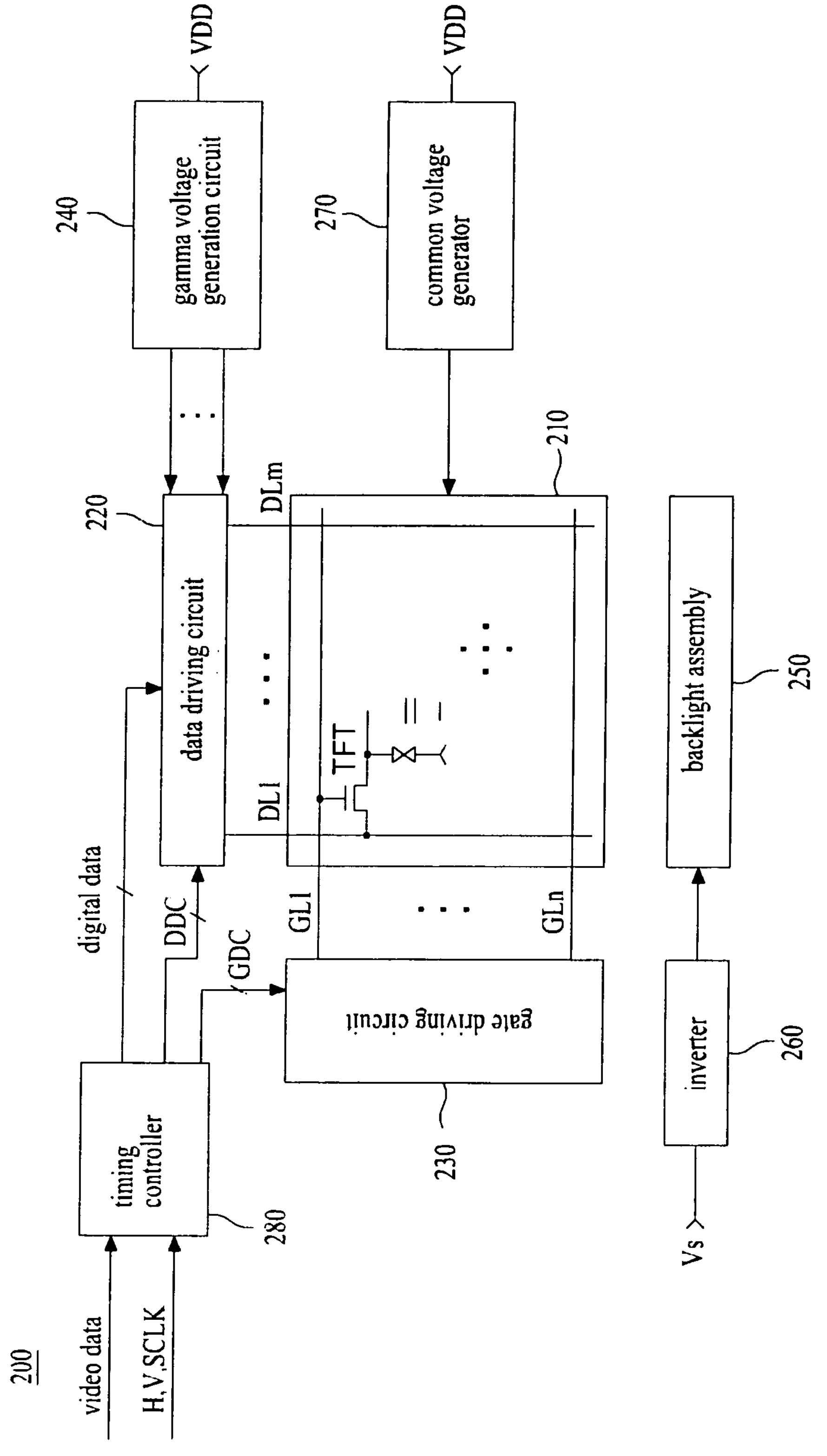
FIG. 3 is a block diagram showing the configuration of a liquid crystal display device according to an exemplary embodiment of the present invention.

FIG. 3 is a block diagram showing the configuration of a liquid crystal display device according to an exemplary embodiment of the present invention.

Referring to FIG. 3, the liquid crystal display device 200 according to an embodiment of the present embodiment includes a liquid crystal display panel 210 including a plurality of data lines DL1 to DLm and a plurality of gate lines GL1 to GLn arranged to cross each other, and a plurality of thin film transistors (TFTs) formed respectively at crossings of the gate lines GL1 to GLn and the data lines DL1 to DLm for driving corresponding liquid crystal cells Clc. The liquid crystal display device 200 further includes a data driving circuit 220 for supplying data to the data lines DL1 to DLm of the liquid crystal display panel 210, a gate driving circuit 230 for supplying scan pulses to the gate lines GL1 to GLn of the liquid crystal display panel 210, a gamma voltage generation circuit 240 for generating gamma reference voltages and supplying the generated gamma reference voltages to the data driving circuit 220, a backlight assembly 250 for emitting light to the liquid crystal display panel 210, an inverter 260 for applying an alternating current (AC) voltage and current to the backlight assembly 250, a common voltage generator 270 for generating a common voltage Vcom and supplying the generated common voltage Vcom to a common electrode of the liquid crystal cells Clc of the liquid crystal display panel 210, and a timing controller 280 for controlling the data driving circuit 220 and the gate driving circuit 230. Here, m and n are natural numbers.

In the liquid crystal display panel 210, liquid crystal is interposed between two glass substrates. The data lines DL1 to DLm cross the gate lines GL1 to GLn on the lower glass substrate of the liquid crystal display panel 210. The TFTs are formed respectively at the crossings of the gate lines GL1 to GLn and the data lines DL1 to DLm. The TFTs supply data on the data lines DL1 to DLm to the liquid crystal cells Clc in response to the scan pulses, respectively. Each TFT has a gate electrode connected to a corresponding one of the gate lines GL1 to GLn, a source electrode connected to a corresponding one of the data lines DL1 to DLm, and a drain electrode connected to a pixel electrode of a corresponding one of the liquid crystal cells Clc and a storage capacitor Cst.

Each TFT is turned on in response to a scan pulse that is supplied to the gate terminal thereof via a gate line connected to the gate terminal thereof, among the gate lines GL1 to GLn. When each TFT is turned on, the turned on TFT supplies video data on a data line connected to the drain terminal thereof, among the data lines DL1 to DLm, to the pixel electrode of the corresponding liquid crystal cell Clc.

The data driving circuit 220 converts digital data (RGB data or RGBW data) input through the timing controller 280 into positive data voltages and negative data voltages capable of expressing gray scales on the liquid crystal cells Clc of the liquid crystal display panel 210, in response to a data drive control signal DDC supplied from the timing controller 280, and supplies the positive data voltages and negative data voltages to the data lines DL1 to DLm. This data driving circuit 220 adjusts the levels of the positive data voltages based on positive gamma reference voltages PGMA1 to PGMAi supplied from the gamma voltage generation circuit 240 and adjusts the levels of the negative data voltages based on negative gamma reference voltages NGMA1 to NGMAi supplied from the gamma voltage generation circuit 240. The configuration and operation of the data driving circuit 220 will be described later in detail with reference to FIG. 4.

The gate driving circuit 230 sequentially generates and supplies scan pulses to the gate lines GL1 to GLn in response to a gate drive control signal GDC supplied from the timing controller 280. At this time, the gate driving circuit 230 determines a high-level voltage and a low-level voltage of each scan pulse, respectively, depending on a gate high voltage VGH and a gate low voltage VGL supplied from a gate drive voltage generator.

The gamma voltage generation circuit 240 receives a supply voltage VDD of a high level, generates the positive gamma reference voltages PGMA1 to PGMAi and the negative gamma reference voltages NGMA1 to NGMAi and supplies them to the data driving circuit 220. The configuration of this gamma voltage generation circuit 240 will be described later in additional detail with reference to FIG. 4.

The backlight assembly 250 is disposed at the rear of the liquid crystal display panel 210 and is energized on by a drive voltage and current supplied from the inverter 260 to emit light unto each pixel of the liquid crystal display panel 210.

The inverter 260 converts a square-wave signal generated therein into a triangle-wave signal, compares the triangle-wave signal with a direct current (DC) supply voltage VCC supplied from a system and generates a burst dimming signal proportional to a result of the comparison. With the burst dimming signal generated in this manner, a drive integrated circuit (IC) provided in the inverter 260 controls the generation of the drive voltage and current to be supplied to the backlight assembly 250 in response to the burst dimming signal.

The common voltage generator 270 receives the high-level supply voltage VDD, generates the common voltage Vcom and supplies the generated common voltage Vcom to the common electrode of the liquid crystal cell Clc formed in each pixel of the liquid crystal display panel 210.

The timing controller 280 supplies video data (RGB data or RGBW data) supplied from the system to the data driving circuit 220. Also, the timing controller 280 generates the data drive control signal DDC and the gate drive control signal GDC using a horizontal/vertical synchronous signal H/V synchronously with a system clock signal SCLK and supplies them to the data driving circuit 220 and gate driving circuit 230, respectively. Here, the data drive control signal DDC includes a source shift clock signal SSC, a source start pulse signal SSP, a polarity control signal POL, and a source output enable signal SOE, and the gate drive control signal GDC includes a gate shift clock signal GSC, a gate start pulse signal GSP, and a gate output enable signal GOE.

Figure 4:
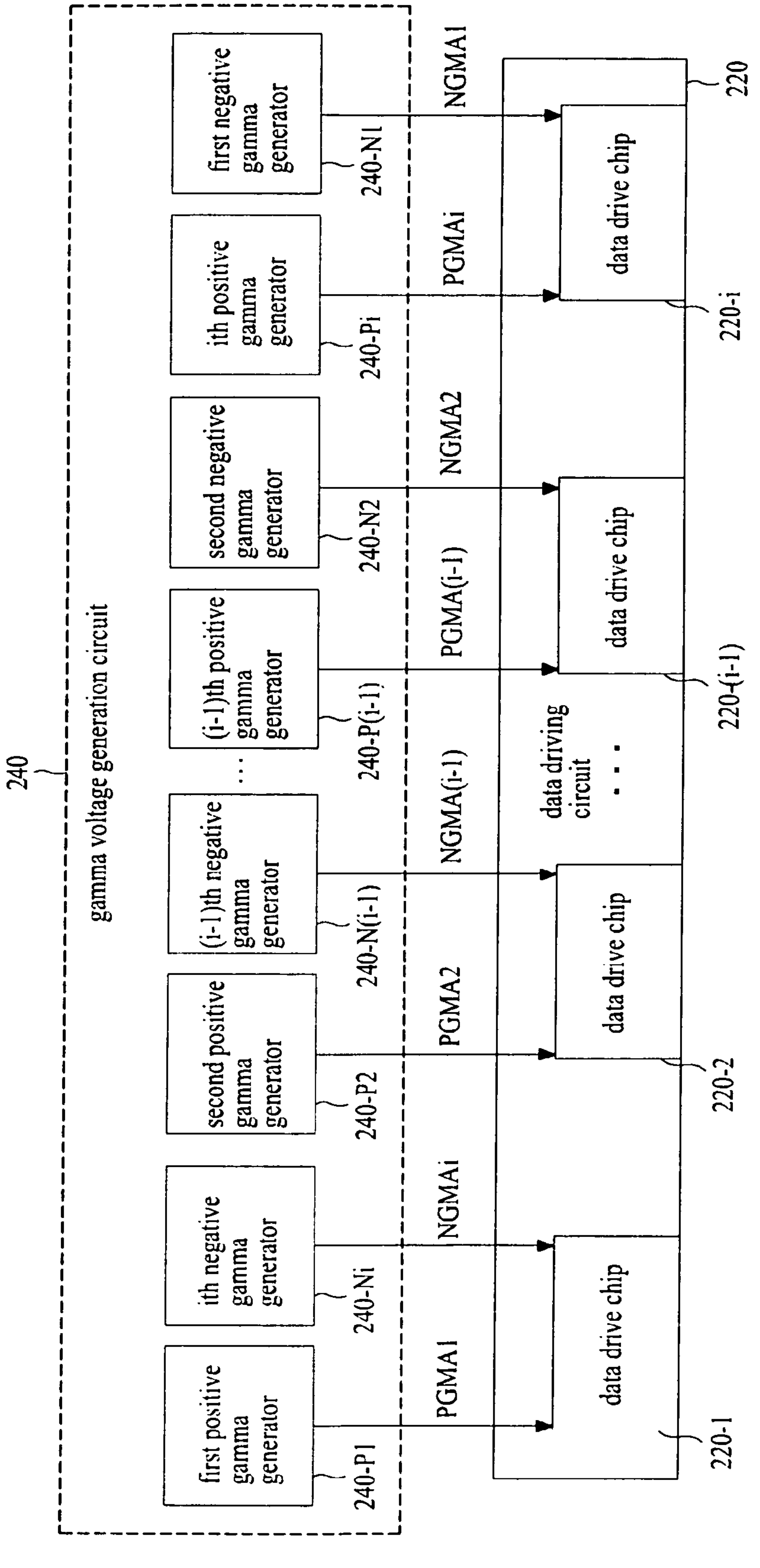
FIG. 4 is a block diagram of a data driving circuit and gamma voltage generation circuit shown in FIG. 3.

FIG. 4 is a block diagram illustrating details of the data driving circuit 220 and gamma voltage generation circuit 240 shown in FIG. 3.

Referring to FIG. 4, the data driving circuit 220 includes a plurality of data drive chips 220-1 to 220-i each for adjusting the level of a positive data voltage based on a positive gamma reference voltage PGMA supplied from the gamma voltage generation circuit 240 and adjusting the level of a negative data voltage based on a negative gamma reference voltage NGMA supplied from the gamma voltage generation circuit 240.

The data drive chip 220-1 converts digital data input through the timing controller 280 into an analog data voltage and supplies the analog data voltage to the liquid crystal display panel 210. The data drive chip 220-1 adjusts the level of a positive data voltage based on the positive gamma reference voltage PGMA1 input from the gamma voltage generation circuit 240 and adjusts the level of a negative data voltage based on the negative gamma reference voltage NGMAi input from the gamma voltage generation circuit 240. Here, the positive gamma reference voltage PGMA1 is lowest in level among the positive gamma reference voltages PGMA1 to PGMAi generated from the gamma voltage generation circuit 240, and the negative gamma reference voltage NGMAi is highest in level among the negative gamma reference voltages NGMA1 to NGMAi generated from the gamma voltage generation circuit 240.

The data drive chip 220-2 converts digital data input through the timing controller 280 into an analog data voltage and supplies the analog data voltage to the liquid crystal display panel 210. The data drive chip 220-2 adjusts the level of a positive data voltage based on the positive gamma reference voltage PGMA2 input from the gamma voltage generation circuit 240 and adjusts the level of a negative data voltage based on the negative gamma reference voltage NGMA(i-1) input from the gamma voltage generation circuit 240. Here, the positive gamma reference voltage PGMA2 is higher in level than the positive gamma reference voltage PGMA1, but lower in level than the other positive gamma reference voltages PGMA3 to PGMAi. Further, the negative gamma reference voltage NGMA(i-1) is lower in level than the negative gamma reference voltage NGMAi, but higher in level than the other negative gamma reference voltages NGMA1 to NGMA(i-2).

The data drive chip 220-(i-1) converts digital data input through the timing controller 280 into an analog data voltage and supplies the analog data voltage to the liquid crystal display panel 210. The data drive chip 220-(i-1) adjusts the level of a positive data voltage based on the positive gamma reference voltage PGMA(i-1) input from the gamma voltage generation circuit 240 and adjusts the level of a negative data voltage based on the negative gamma reference voltage NGMA2 input from the gamma voltage generation circuit 240. Here, the negative gamma reference voltage NGMA2 is higher in level than the negative gamma reference voltage NGMA1, but lower in level than the other negative gamma reference voltages NGMA3 to NGMAi. Further, the positive gamma reference voltage PGMA(i-1) is lower in level than the positive gamma reference voltage PGMAi, but higher in level than the other positive gamma reference voltages PGMA1 to PGMA(i-2).

The data drive chip 220-i converts digital data input through the timing controller 280 into an analog data voltage and supplies the analog data voltage to the liquid crystal display panel 210. The data drive chip 220-i adjusts the level of a positive data voltage based on the positive gamma reference voltage PGMAi input from the gamma voltage generation circuit 240 and adjusts the level of a negative data voltage based on the negative gamma reference voltage NGMA1 input from the gamma voltage generation circuit 240. Here, the positive gamma reference voltage PGMAi is highest in level among the positive gamma reference voltages PGMA1 to PGMAi generated from the gamma voltage generation circuit 240, and the negative gamma reference voltage NGMA1 is lowest in level among the negative gamma reference voltages NGMA1 to NGMAi generated from the gamma voltage generation circuit 240.

The data drive chips 220-3 to 220-(i-2) are supplied with the corresponding positive gamma reference voltages and negative gamma reference voltages in the same pattern as the above-stated data drive chips 220-1, 220-2, 220-(i-1) and 220-i.

Current of a level proportional to the levels of the positive gamma reference voltage PGMA and negative gamma reference voltage NGMA is supplied to each of the data drive chips 220-1 to 220-i. The level of the supplied current includes the level of the level of current supplied together with the positive gamma reference voltage PGMA and the level of current supplied together with the negative gamma reference voltage NGMA.

Therefore, the level of current that is supplied to the first data drive chip 220-1 and the level of current that is supplied to the ith data drive chip 220-i are more nearly the same. Particularly, the level of current that is supplied to the ith data drive chip 220-i is an added level of the level of current that is supplied together with the positive gamma reference voltage PGMAi of the highest level and the level of current that is supplied together with the negative gamma reference voltage NGMA1 of the lowest level. As a result, the level of current that is supplied to the ith data drive chip 220-i is much lower than that when the positive gamma reference voltage PGMAi and negative gamma reference voltage NGMAi of the highest levels are supplied at the same time.

Similarly, the level of current that is supplied to the second data drive chip 220-2 and the level of current that is supplied to the (i-1)th data drive chip 220-(i-1) are the same. Particularly, the level of current that is supplied to the (i-1)th data drive chip 220-(i-1) is an added level of the level of current that is supplied together with the positive gamma reference voltage PGMA(i-1) and the level of current that is supplied together with the negative gamma reference voltage NGMA2. As a result, the level of current that is supplied to the (i-1)th data drive chip 220-(i-1) is much lower than that when the positive gamma reference voltage PGMA(i-1) and negative gamma reference voltage NGMA(i-1) are supplied at the same time.

In this manner, according to the present invention, the amounts of currents to be supplied to specific data drive chips that would be supplied with excessive currents in the related art devices, can be significantly reduced, thereby significantly lowering the temperatures due to heat being generated in the specific data drive chips.

The gamma voltage generation circuit 240 includes first to ith positive gamma generators 240-P1 to 240-Pi for generating the positive gamma reference voltages PGMA1 to PGMAi, respectively, and first to ith negative gamma generators 240-N1 to 240-Ni for generating the negative gamma reference voltages NGMA1 to NGMAi, respectively.

The first positive gamma generator 240-P1 supplies the positive gamma reference voltage PGMA1, that is lowest in level among the positive gamma reference voltages PGMA1 to PGMAi, to the first data drive chip 220-1, and the ith negative gamma generator 240-Ni supplies the negative gamma reference voltage NGMAi, that is highest in level among the negative gamma reference voltages NGMA1 to NGMAi, to the first data drive chip 220-1. That is, added current of current of a level proportional to the level of the positive gamma reference voltage PGMA1 and current of a level proportional to the level of the negative gamma reference voltage NGMAi is supplied to the first data drive chip 220-1.

The second positive gamma generator 240-P2 supplies the positive gamma reference voltage PGMA2, that is higher in level than the positive gamma reference voltage PGMA1, but lower in level than the other positive gamma reference voltages PGMA3 to PGMAi, to the second data drive chip 220-2, and the (i-1)th negative gamma generator 240-N(i-1) supplies the negative gamma reference voltage NGMA(i-1), that is lower in level than the negative gamma reference voltage NGMAi, but higher in level than the other negative gamma reference voltages NGMA1 to NGMA(i-2), to the second data drive chip 220-2. That is, added current of current of a level proportional to the level of the positive gamma reference voltage PGMA2 and current of a level proportional to the level of the negative gamma reference voltage NGMA(i-1) is supplied to the second data drive chip 220-2.

The (i-1)th positive gamma generator 240-P(i-1) supplies the positive gamma reference voltage PGMA(i-1), that is lower in level than the positive gamma reference voltage PGMAi, but higher in level than the other positive gamma reference voltages PGMA1 to PGMA(i-2), to the (i-1)th data drive chip 220-(i-1), and the second negative gamma generator 240-N2 supplies the negative gamma reference voltage NGMA2, that is higher in level than the negative gamma reference voltage NGMA1, but lower in level than the other negative gamma reference voltages NGMA3 to NGMAi, to the (i-1)th data drive chip 220-(i-1). That is, added current of current of a level proportional to the level of the positive gamma reference voltage PGMA(i-1) and current of a level proportional to the level of the negative gamma reference voltage NGMA2 is supplied to the (i-1)th data drive chip 220-(i-1).

The ith positive gamma generator 240-Pi supplies the positive gamma reference voltage PGMAi, that is highest in level among the positive gamma reference voltages PGMA1 to PGMAi, to the last data drive chip 220-i, and the first negative gamma generator 240-N1 supplies the negative gamma reference voltage NGMA1, that is lowest in level among the negative gamma reference voltages NGMA1 to NGMAi, to the last data drive chip 220-i. That is, added current of current of a level proportional to the level of the positive gamma reference voltage PGMAi and current of a level proportional to the level of the negative gamma reference voltage NGMA1 is supplied to the last data drive chip 220-i.

Also, the third to (i-2)th positive gamma generators 240-P3 to 240-P(i-2) and the third to (i-2)th negative gamma generators 204-N3 to 240-N(i-2) supply the corresponding positive gamma reference voltages and negative gamma reference voltages in the same pattern as the above-stated positive gamma generators 240-P1, 240-P2, 240-P(i-1) and 240-Pi and negative gamma generators 240-N1, 240-N2, 240-N(i-1) and 240-Ni.

Figure 5:
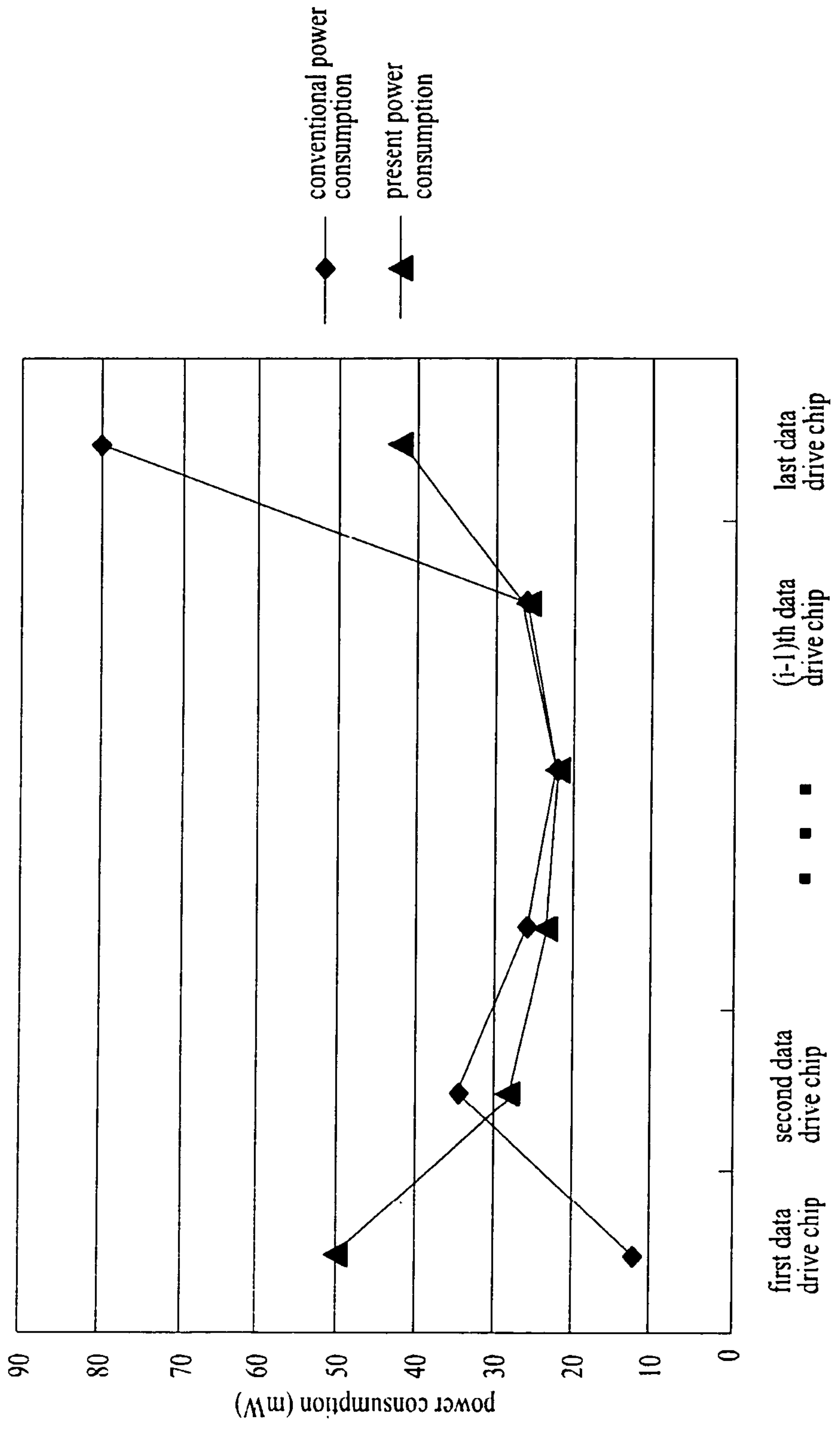
FIG. 5 is a graph illustrating heat generation characteristics of data drive chips in the liquid crystal display device according to the present embodiment.

FIG. 5 is a graph illustrating heat generation characteristics of data drive chips in the liquid crystal display device according to the present embodiment.

Figure 1:
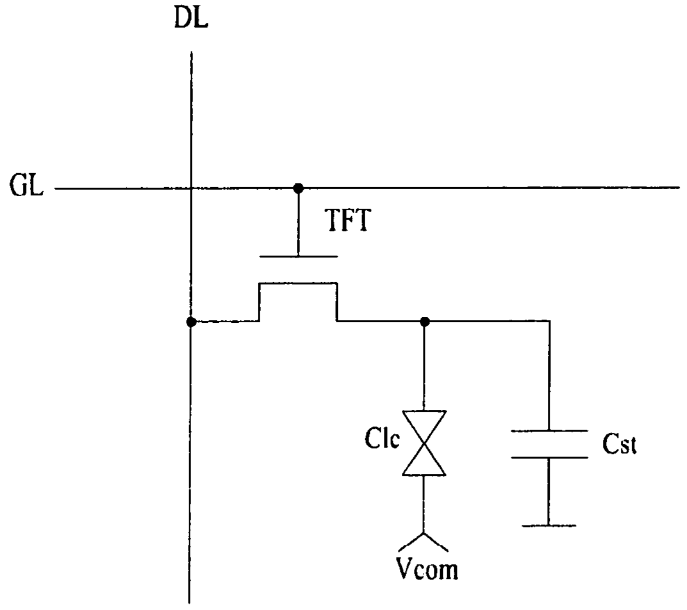
FIG. 1 Related Art
FIG. 1 is an equivalent circuit diagram of each pixel formed in a general liquid crystal display device.
Figure 2:
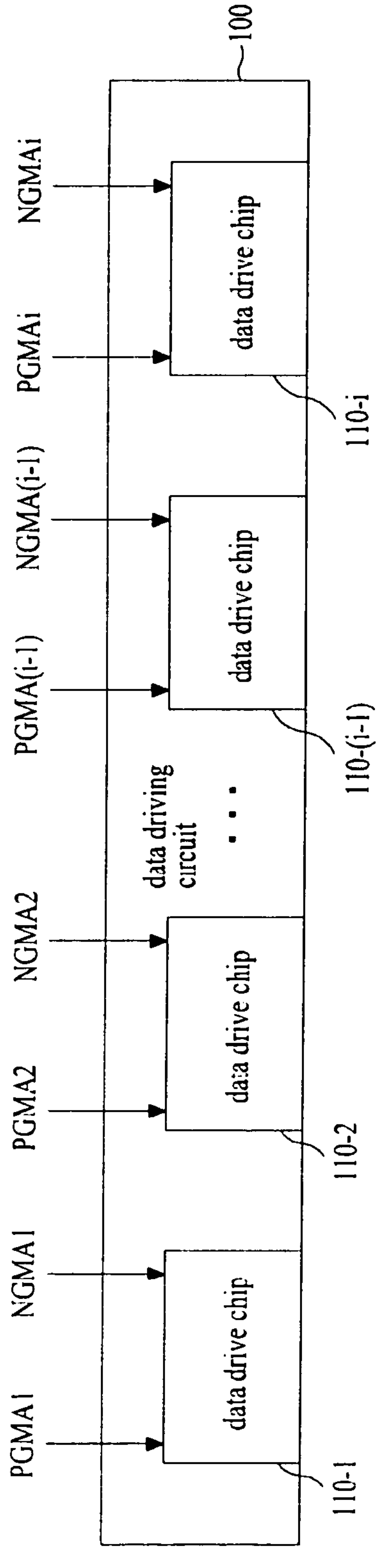
FIG. 2 Related Art
FIG. 2 is a block diagram showing the configuration of a data driving circuit included in a liquid crystal display device according to the related art.

Referring to FIG. 5, when the positive gamma reference voltages and negative gamma reference voltages are supplied to the data drive chips in the related art gamma reference voltage supply pattern as shown in FIG. 2, a large amount of power is consumed in the last data drive chip and the (i-1)th data drive chip. In contrast, when the positive gamma reference voltages and negative gamma reference voltages are supplied to the data drive chips in the gamma reference voltage supply pattern according to the present invention as shown in FIG. 4, a relatively very small amount of power is consumed in the last data drive chip and (i-1)th data drive chip.

As apparent from the above description, by using a gamma reference voltage supply pattern according to the present invention, the total amount of currents to be applied to specific ones of a plurality of data drive chips can be reduced. Therefore, it is possible to significantly lower the temperatures being generated in the specific data drive chips.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:

a gamma voltage generation circuit that generates first to ith positive gamma reference voltages, where i is a natural number greater than or equal to 2, having different levels, and first to ith negative gamma reference voltages having different levels, and that divides into and transmits a plurality of pairs of gamma reference voltages, each pair of one of the first to ith positive gamma reference voltages and one of the first to ith negative gamma reference voltages; and a plurality of data drive chips, each of the data drive chips supplied with a corresponding pair of one of the first to ith positive gamma reference voltages and one of the first to ith negative gamma reference voltages and converting digital data input thereto into a positive data voltage and a negative data voltage and supplying the positive data voltage and negative data voltage to a liquid crystal display panel, and adjusting a level of the positive data voltage based on a positive gamma reference voltage supplied thereto, among the first to ith positive gamma reference voltages, and adjusting a level of the negative data voltage based on a negative gamma reference voltage supplied thereto, among the first to ith negative gamma reference voltages, wherein one of the data drive chips is supplied with one of the plurality of pairs of a positive gamma reference voltage of a highest level among the first to ith positive gamma reference voltages, and a negative gamma reference voltage of a lowest level among the first to ith negative gamma reference voltages.

2. The liquid crystal display device according to claim 1, wherein another one of the data drive chips is supplied with a positive gamma reference voltage of a lowest level among the first to ith positive gamma reference voltages, and a negative gamma reference voltage of a highest level among the first to ith negative gamma reference voltages.

3. The liquid crystal display device according to claim 1, wherein for each of the data drive chips, the k-th highest positive gamma reference voltage among the first to ith positive gamma reference voltages and the k-th lowest negative gamma reference voltage among the first to ith negative gamma reference voltages are supplied to the respective data drive chip, where k is an integer.

4. A method for driving a liquid crystal display device, comprising:

generating first to ith positive gamma reference voltages, where i is a natural number greater than or equal to 2, each having different levels, and first to ith negative gamma reference voltages each having different levels; and dividing into and transmitting a plurality of pairs of gamma reference voltages, each pair of one of the first to ith positive gamma reference voltages and one of the first to ith negative gamma reference voltages;

a plurality of data drive chips, each supplied with a corresponding pair of one of the first to ith positive gamma reference voltages and one of the first to ith negative gamma reference voltages and converting digital data input thereto into a positive data voltage and a negative data voltage and supplying the positive data voltage and negative data voltage to a liquid crystal display panel, and adjusting a level of the positive data voltage based on a positive gamma reference voltage supplied thereto, among the first to ith positive gamma reference voltages, and adjusting a level of the negative data voltage based on a negative gamma reference voltage supplied thereto, among the first to ith negative gamma reference voltages, wherein one of the data drive chips is supplied with one of the plurality of pairs of a positive gamma reference voltage of a highest level among the first to ith positive gamma reference voltages, and a negative gamma reference voltage of a lowest level among the first to ith negative gamma reference voltages.

5. The method according to claim 4, wherein another one of the data drive chips is supplied with a positive gamma reference voltage of a lowest level among the first to ith positive gamma reference voltages, and a negative gamma reference voltage of a highest level among the first to ith negative gamma reference voltages.

6. The method according to claim 4, wherein for each of the data drive chips, the k-th highest positive gamma reference voltage among the first to ith positive gamma reference voltages and the k-th lowest negative gamma reference voltage among the first to ith negative gamma reference voltages are supplied to the respective data drive chip, where k is an integer.

* * * * *